United States Patent [19]
Lewis, Sr. et al.

[11] Patent Number: 6,024,263
[45] Date of Patent: Feb. 15, 2000

[54] HINGED CARRIER ASSEMBLY FOR SPORT EQUIPMENT TRAILERS

[76] Inventors: Edward B. Lewis, Sr., 1035 Mitchell La., Big Bear City, Calif. 92314; Charles F. Thayer, 13642 E. Cornishcrest Rd., Whittier, Calif. 90605

[21] Appl. No.: 09/250,873

[22] Filed: Feb. 16, 1999

[51] Int. Cl.$^7$ ...................................................... B60R 9/06
[52] U.S. Cl. .......................... 224/509; 224/502; 224/526; 414/462
[58] Field of Search ................................... 224/488, 495, 224/502–509, 522–527; 414/462

[56] References Cited

U.S. PATENT DOCUMENTS

| | | | |
|---|---|---|---|
| 2,541,244 | 2/1951 | Hack | 224/493 |
| 2,777,625 | 1/1957 | Kronhaus et al. | 224/498 |
| 3,837,513 | 9/1974 | Adamek | 414/462 |
| 4,400,129 | 8/1983 | Eisenberg et al. | 224/505 X |
| 4,593,840 | 6/1986 | Chown | 224/527 X |
| 4,756,457 | 7/1988 | Polk | 224/509 |
| 4,907,728 | 3/1990 | Giblet | 224/506 X |
| 4,976,386 | 12/1990 | Geiger | 224/509 |
| 5,375,773 | 12/1994 | Lewis | 224/509 X |
| 5,419,665 | 5/1995 | Adams et al. | 411/84 |

*Primary Examiner*—Gregory M. Vidovich
*Attorney, Agent, or Firm*—Edgar W. Averill, Jr.

[57] ABSTRACT

A hinged carrier assembly for carrying and storing articles at the rear end of a sport equipment trailer, and capable of swinging outward and away to allow access to the rear cargo area. The hinged carrier assembly has an elongated receptacle which is secured to one corner at the rear end of the sport equipment trailer by a hinge assembly. The hinge assembly is directly secured to a hollow frame member at the corner using a supporting backing plate inserted inside the hollow frame member. The elongated receptacle can swing outward to a maximum angle which can be adjusted by an adjustable stopper assembly. The elongated receptacle is additionally supported by a suspension line which links the remote end of the elongated receptacle to an elevated point above the hinge assembly. An upper end of the suspension-line is secured to a swivel assembly which allows the suspension-line to pivot smoothly together with the elongated receptacle as it is swung open and closed. An additional adjustable vertical support stand is secured to the elongated receptacle at the remote end to further support the elongated receptacle.

19 Claims, 5 Drawing Sheets

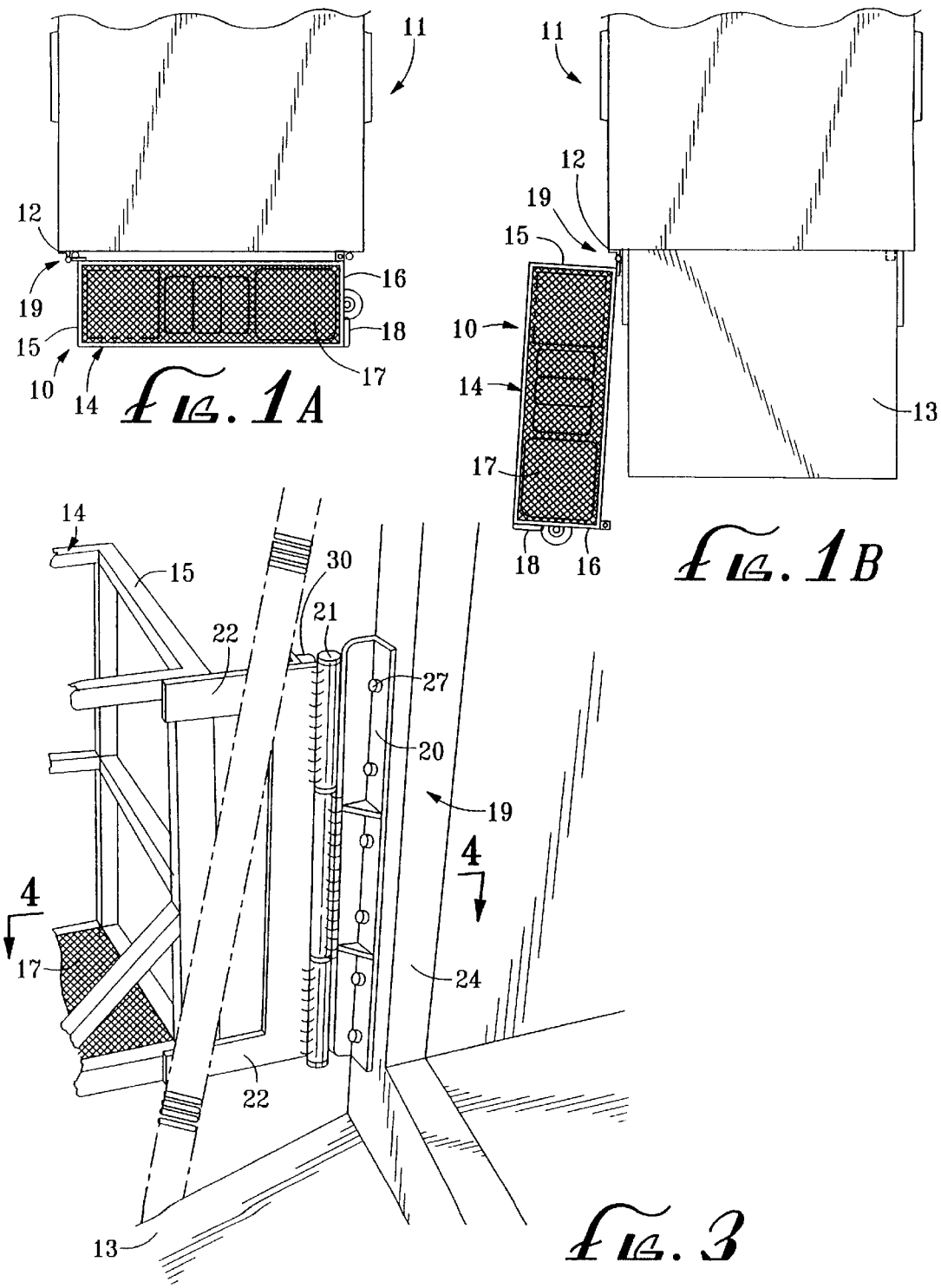

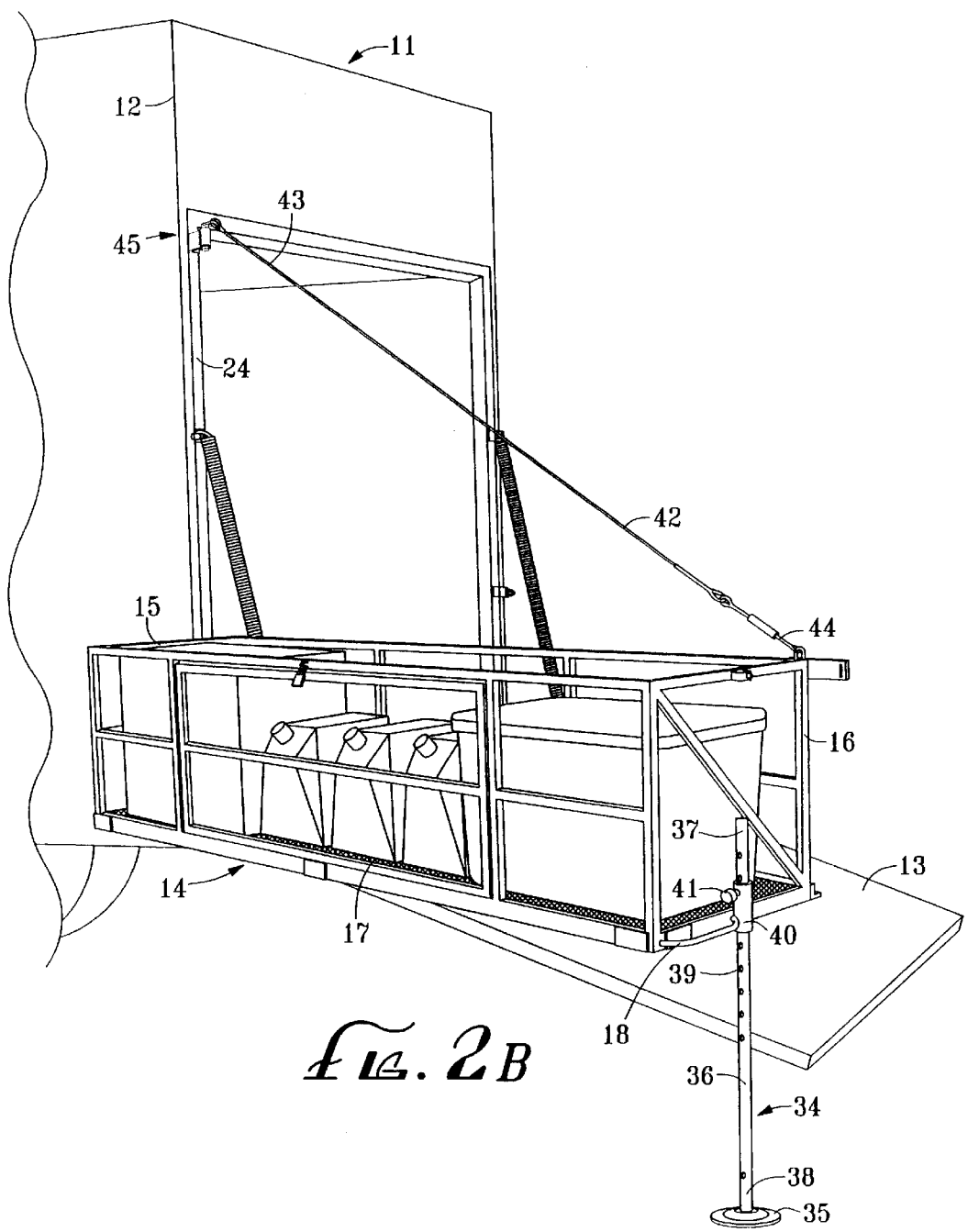

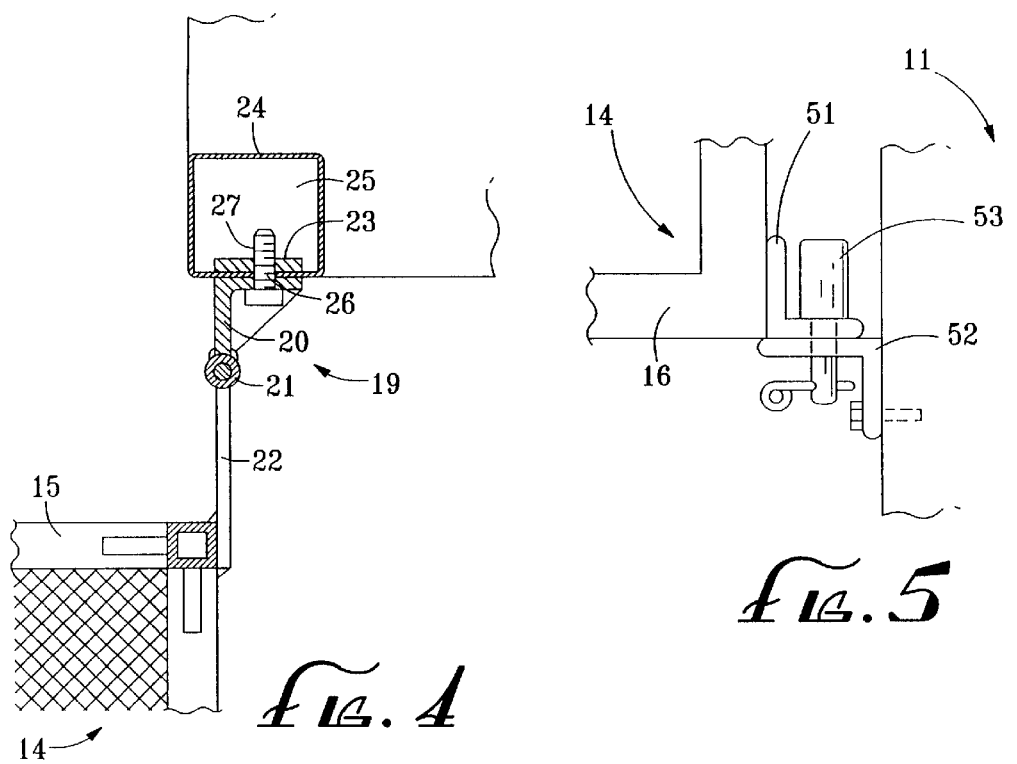
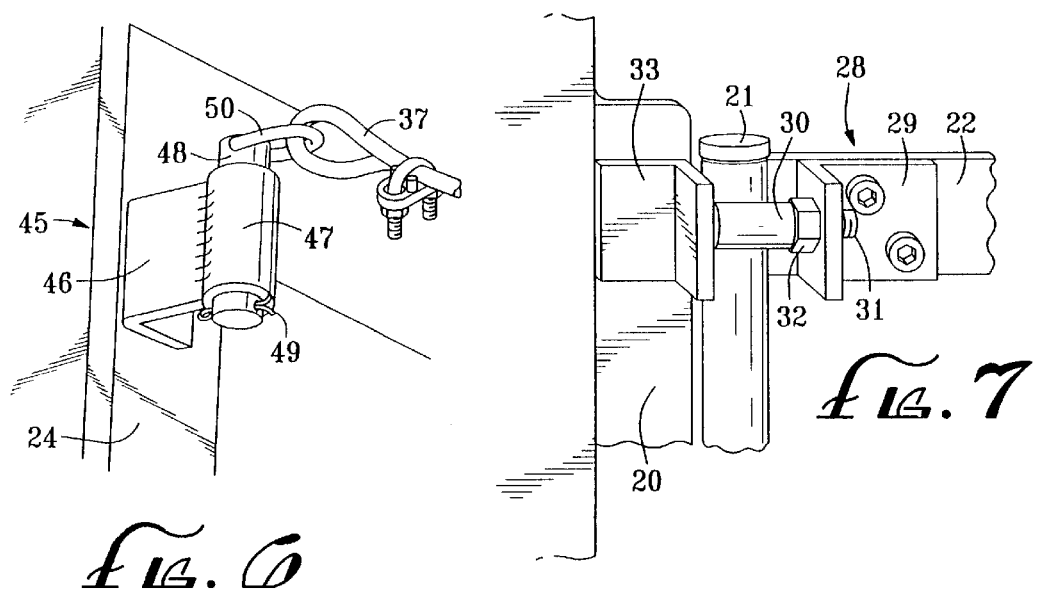

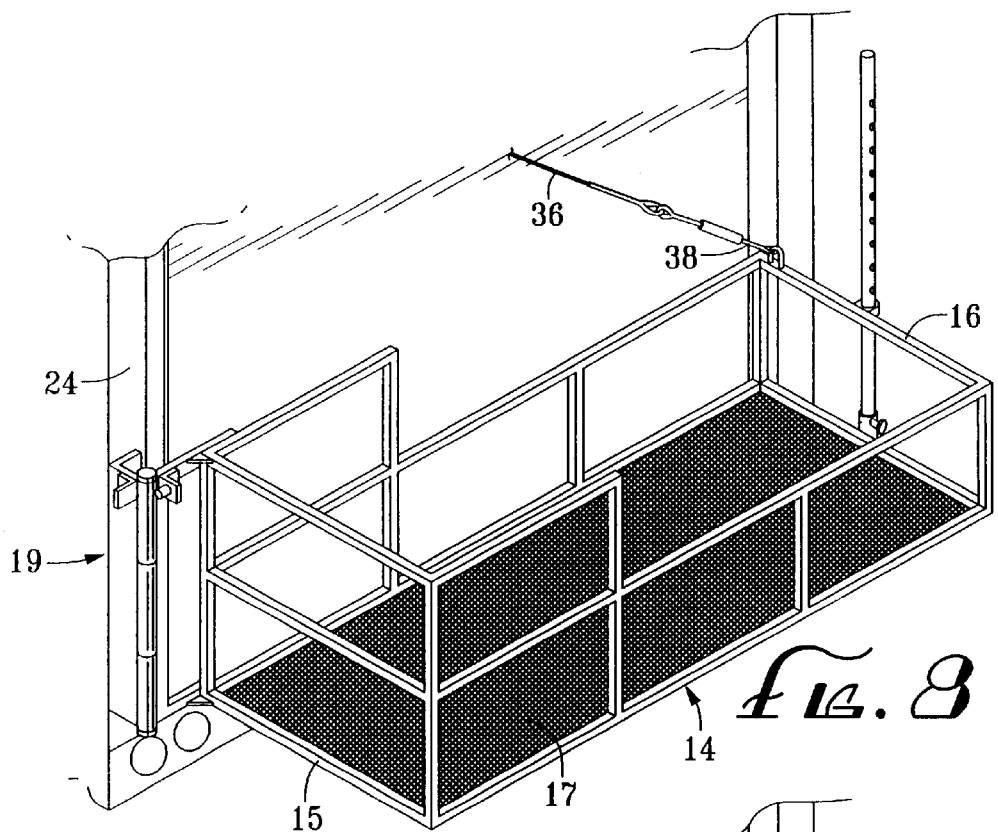
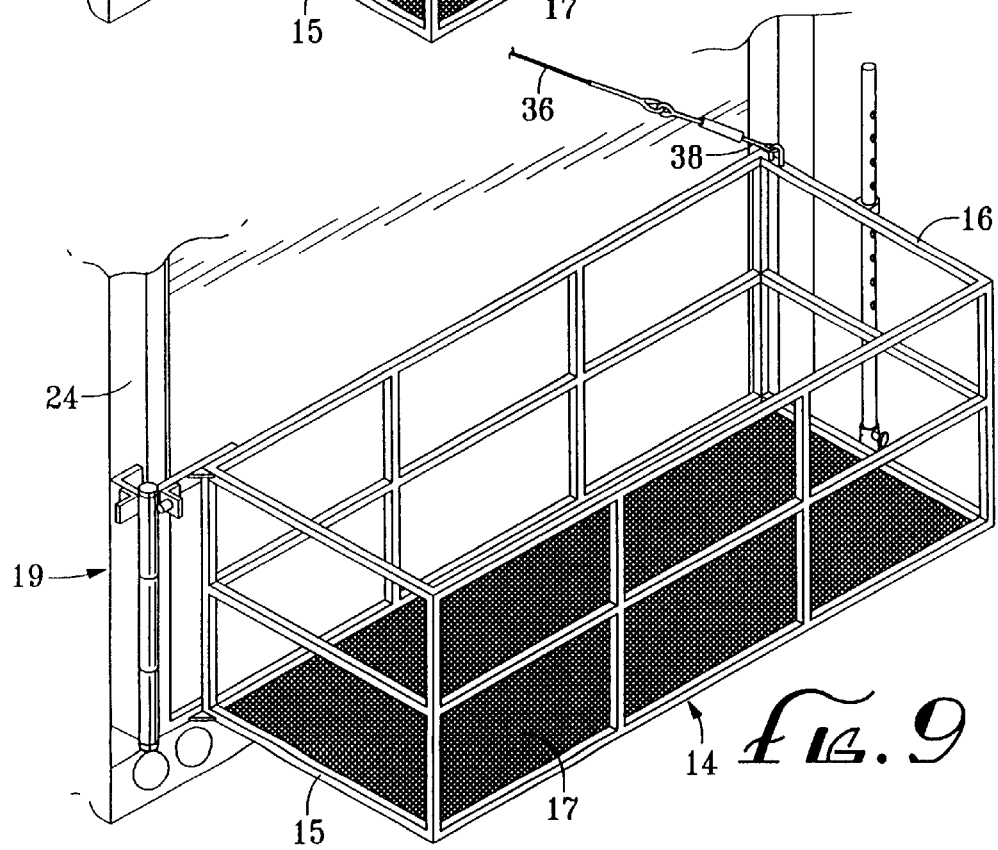

HINGED CARRIER ASSEMBLY FOR SPORT EQUIPMENT TRAILERS

BACKGROUND OF THE INVENTION

The field of the invention generally pertains to a carrier assembly. The invention relates more particularly to a carrier assembly hinge-mounted to one corner of the rear end of a trailer. The carrier assembly is capable of swinging outward and away from the rear end of the trailer to provide uninhibited access to the trailer's rear cargo area.

Carrier assemblies have been mounted to the rear end of vehicles in a variety of ways to provide additional carrying and/or storage space without inhibiting access to the rear cargo area of a vehicle. Many carrier assemblies accomplish this by providing a way to swing the carrier assembly away from the rear end of the vehicle to gain access to the rear cargo area through the tailgate, rear cargo panel, or rear door.

A baggage carrier assembly is shown in U.S. Pat. No. 1,575,225 where a pair of cross-connected arms is secured to any suitable part of an automobile at the rear end. A rack is pivotally mounted to one arm by a pivot pin at a first pivot joint. This enables the rack to swing outward in a horizontal plane. The rack has a second and independent pivot joint which enables one portion of the rack to be folded upwards against the rear end of the automobile when not in use.

One disadvantage of the baggage carrier assembly in U.S. Pat. No. 1,575,225, however, is that it uses a single pivot pin at the first pivot joint to swing the rack outward in a horizontal plane. Since the rack secured to the arm at the first pivot joint acts much like a cantilever beam against a supporting wall when the rack is swung outward, the single pivot pin alone must bear loads and stresses similar to those associated with cantilever beams. In particular, the single pivot pin must bear the stress caused by a moment exerted on the pivot pin. The moment is created by a load exerted on the rack, as well as the weight of the rack itself. Although probably sufficient for simple luggage pieces and other lightweight items, the single pivot pin would be incapable of handling heavier loads associated with equipment typically used with trailers, such as electric generators, fuel, and heavy tools and equipment. Swinging open the baggage carrier assembly with a heavier load placed on the rack could result in failure of the pivot pin and cause damage to the baggage carrier assembly and its contents.

In U.S. Pat. No. 3,202,332 a luggage carrier is shown having a pair of support arms bolted to the frame of an automobile and additionally L-bolted to a rear car bumper. An auxiliary trunk is pivotally mounted to one support arm by a single bolt extending through a bottom side wall of the auxiliary trunk at one corner. Additionally, this luggage carrier has a stationary support member spring-mounted on the remote end of the trunk's bottom side. The stationary support member swings down to a fixed vertical position and is used to support the rack when swung outward to an open position. However, unless the vehicle is parked on a flat surface, the stationary support member would be too short or too long.

Similar to U.S. Pat. No. 1,575,225, the luggage carrier in U.S. Pat. No. 3,202,332 is also disadvantaged by the use of a single bolt to pivot the auxiliary trunk on the connecting support arm. The single bolt alone must bear the loads and stresses similar to those found in cantilever beams. Although this luggage carrier provides for a support stand at a remote end of the carrier assembly to mitigate cantilever stresses, it is not particularly designed for use without the support stand. Specifically, the single bolt alone could not durably bear the cantilever loads and stresses if the support stand was continuously, albeit inadvertently, omitted from use. The support stand also has a fixed height which is incapable of adjusting to irregular terrains with various heights. Swinging open the luggage carrier with a heavy load placed on the auxiliary trunk could result in failure of the single bolt pivot joint and cause damage to the luggage carrier and its contents.

In U.S. Pat. No. 4,756,457 a cargo apparatus for "minivans" and similar vehicles is shown where a pair of container halves are each hinge-mounted to taillight recesses at the rear corner of a mini-van-type vehicle. Taillight assemblies found in the taillight recesses are removed and replaced with box beams. The box beams are secured inside the taillight recesses by securing each box beam to an angle iron member positioned on the reverse side of a taillight recess wall. The taillight recess wall is thus sandwiched between the box beam and the angle iron member. A hinge base of a hinge assembly is then secured to the box beam, and a receptacle hinge plate of the hinge assembly is secured to a front wall of a container halve. Similar to the disclosures in U.S. Pat. No. 1,575,225 and U.S. Pat. No. 3,202,332, this cargo apparatus is also not designed or intended to support heavy loads. Since the taillight recess wall is comprised of sheet-metal, it provides a weak support point for securing the cargo apparatus. The taillight recess wall would easily fatigue and deform under the heavy loads typically associated with trailers. And in fact, two separate hinges are required to support the cargo apparatus. Each hinge supports only one-half of the cargo apparatus. And each hinged part only extends halfway across the back of the vehicle.

Finally in U.S. Pat. No. 5,544,799 a swing away cargo carrier assembly is shown for use with a vehicle having a receiver-type hitch at the rear end. A main support member is inserted into the receiver-type hitch. A main extension arm is fixedly attached to the main support member and extends laterally along the rear of the vehicle. A pivot support member having a C-shaped cross-section is fixedly attached to and extends rearwardly from the main extension arm. And finally, a swing arm is pivotally mounted to the pivot support member by a single bolt. This allows the swing arm to swing outwardly from the rear end of a vehicle. The disadvantage of this design is its use of a single bolt at its pivot joint. As discussed previously, a single bolt is generally inadequate for supporting heavy loads. Using a single bolt increases the risk of fatigue and failure at the pivot joint when the swing arm is fully extended with a heavy load.

As can be seen from the above prior disclosures, there are many practical benefits to a swinging carrier assembly mounted to the rear end of a vehicle. They all provide a way to carry and/or store additional cargo on the exterior of a vehicle. They also provide a way of swinging a receptacle component away from the rear end of a vehicle in order to allow access to the rear cargo area of the vehicle. Generally, however, the swinging carrier assemblies disclosed in the prior art are not designed or intended for use with trailers. They are not suited to meet the particular needs and greater demands typically required by trailers.

In particular, articles and equipment commonly carried and/or stored in trailers are different and impart a much heavier load than those commonly carried and/or stored in passenger vehicles. Equipment typically carried in trailers include electric generators, fuel tanks, and the like. However, gasoline tanks and gasoline powered apparatus such as electric generators are not permitted to be carried within a trailer since they comprise a fire/explosive hazard. Electric generators, fuel tanks, and similar equipment are thus, of necessity, items carried only outside of the trailer compartment. And since electric generators and fuel tanks impart much heavier loads, swinging carrier assemblies used with trailers require greater support and durability at the pivot joints. Greater support and durability are especially required when the container component is swung open because of the cantilever-like loads and stresses which are created at the pivot joint.

To summarize, there is a need for an improved swinging carrier assembly intended and especially designed for use with trailers. The existing prior disclosures lack the durability to withstand the greater cantilever-like loads and stresses associated with equipment typically used with trailers.

BRIEF SUMMARY OF THE INVENTION

It is an object of the present invention to provide a reliable and durable hinged carrying apparatus which is hingedly secured directly to a frame member or chassis at the rear end of a sport equipment trailer.

It is a further object of the present invention to provide a reliable and durable hinged carrying apparatus capable of swinging outward and away from the rear end of the sport equipment trailer, so as to enable uninhibited access to the rear cargo area of the sport equipment trailer.

The present invention is for a hinged carrier assembly for carrying and/or storing equipment and other articles at the rear end of a sport equipment trailer. The hinged carrier assembly has an elongated receptacle which is capable of swinging outward to an open and extended position to allow complete and unobstructed access to the rear cargo area of the sport equipment trailer. The elongated receptacle is secured directly to a hollow frame member at a corner of the rear end by a hinge assembly. The elongated receptacle is preferably supported by a suspension-line support member which has an upper end connected to the hinge corner by a swivel assembly, and a lower end connected to a remote end of the elongated receptacle. A vertically adjustable support stand preferably supports the elongated receptacle at its remote end. The maximum pivot angle capable by the elongated receptacle can be adjusted by a stopper assembly fixedly attached to the hinge assembly.

BRIEF DESCRIPTION OF THE DRAWING

FIG. 1A is a top view of the hinged carrier assembly in a retracted position.

FIG. 1B is a top view of the hinged carrier assembly in a fully extended position, with a ramp positioned for loading and unloading.

FIG. 2B is a perspective view of the hinged carrier assembly in a fully extended position with a ramp positioned for loading and unloading.

FIG. 3 is an enlarged perspective view of the hinge assembly with the hinged carrier assembly fully extended position and with a ramp positioned for loading and unloading.

FIG. 4 is a cross-sectional view taken along the line of 4—4 of FIG. 3.

FIG. 5 is a view partly in cross-section taken along the line of 5—5 of FIG. 2A.

FIG. 6 is an enlarged perspective view of the swivel assembly enclosed in the circle 6 of FIG. 2A.

FIG. 7 is an enlarged perspective view of the stopper assembly with the hinged carrier assembly in a fully extended position.

FIG. 8 is a perspective view of the hinged carrier assembly in a retracted position with a first embodiment of the elongated receptacle.

FIG. 9 is a perspective view of the hinged carrier assembly in a retracted position with a second embodiment of the elongated receptacle.

DETAILED DESCRIPTION OF THE PREFERRED EMBODIMENTS

Figure 2A:
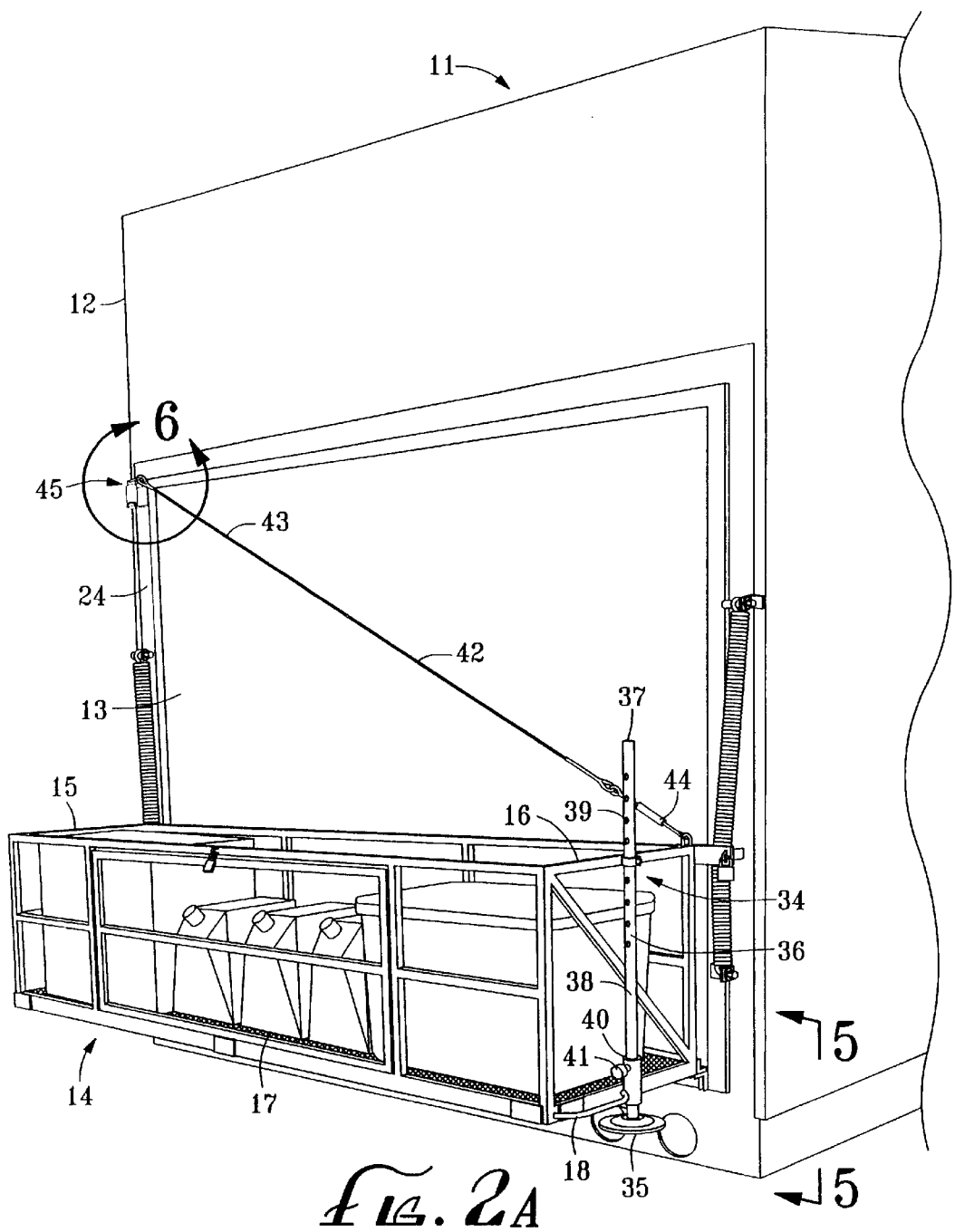
FIG. 2A is a perspective view of the hinged carrier assembly in a retracted position.

Referring now to the drawings, FIG. 1A and FIG. 1B show the top view of the hinged carrier assembly, generally indicated at 10, which is hingedly secured to a mounting corner 12 at the rear end of a sport equipment trailer, generally indicated at 11. The hinged carrier assembly 10 has an elongated receptacle 14 with a pivot end 15, a swing end 16, and a platform base 17 which extends across the rear end of the sport equipment trailer 11. The pivot end 15 is hingedly secured to the mounting corner 12 by a hinge assembly, generally indicated at 19. And as can be seen in FIG. 8 and FIG. 9, the elongated receptacle 14 preferably has a skeletal open-frame of construction in order to easily dissipate toxic gases and fumes emitted by such equipment as of hinge electric generators and fuel tanks.

FIG. 1A and FIG. 1B together show the swing movement of the hinged carrier assembly 10 about the mounting corner 12. FIG. 1A shows the hinged carrier assembly 10 in a retracted position, and FIG. 1B shows the hinged carrier assembly 10 in a fully open and extended position. Additionally, FIG. 2A and FIG. 2B also show the perspective views of the retracted (FIG. 2A) and fully extended (FIG. 2B) positions resulting from the swing movement of the hinged carrier assembly 10. The elongated receptacle 14 can be pivoted from the retracted position to the fully extended position by manually pulling either the elongated receptacle 14 itself or a handle member 18 located at the swing end 16 of the elongated receptacle 14. The handle member 18 can be best seen in FIG. 2A and FIG. 2B. Both FIG. 1B and FIG. 2B further show a ramp 13 positioned for loading and unloading at the rear end of the sport equipment trailer 11 to illustrate the space required to allow full and uninhibited access to the rear cargo area of the sport equipment trailer 11. The swing movement of the elongated receptacle 14 is adjustable to a desired maximum angle by an adjustable stopper assembly 28 which will be discussed in detail.

FIG. 3 shows an enlarged perspective view of the hinge assembly 19 when the hinged carrier assembly 10 is in a fully extended position. The hinge assembly 19 has a general hinge configuration with a hinge base 20 and a hinge arm 22 connected by a hinge joint 21. The hinge assembly 19 is positioned along the mounting corner 12 with its hinge joint 21 parallel to the edge of the mounting corner 12. This allows the elongated receptacle 14 to swing outward on a horizontal plane. Since the hinge assembly 19 is intended to support heavy loads common to equipment used with sport equipment trailer's 11, the hinge assembly 19, including the hinge base 20 and hinge joint 21, preferably has a vertical height at least as tall as the height of the pivot end 15 of the elongated receptacle 14. This ensures that the cantilever-like loads and stresses are distributed over a greater area than with a shorter hinge assembly. The hinge base 20 has a plurality of holes through which threaded fasteners 27, preferably bolt fasteners, affix the hinge base 20 to a hollow frame member 24 at the mounting corner 12. And the hinge arm 22 is fixedly attached to the pivot end 15 of the elongated receptacle 14.

Securing the hinge assembly 19 to the hollow frame member 24 involves a simple series of preparatory steps. First, the plurality of holes on the hinge base 20 is used as a template to pre-drill holes into the hollow frame member 24 by conventional drilling means. As can be seen in FIG. 4 showing a cross-sectional view taken along the line of 4—4 of FIG. 3, the hollow frame member 24 has an inner cavity 25, and an opening at a lower end. Second, a backing plate 23 is slidably positioned inside the inner cavity 25 through the opening at the lower end of the hollow frame member 24. The backing plate 23 has a plurality of threaded holes which are aligned with the plurality of pre-drilled holes 26 on the hollow frame member 24. Finally, threaded fasteners 27 having an elongated threaded shank portion and an enlarged head portion are used to secure the hinge base 20 to the hollow frame member 24. The elongated threaded shank portions extend through the holes in the hinge base 20, extend through the pre-drilled holes 26 in the hollow frame member 24, and threadedly extend and secure to the aligned holes in the backing plate 23.

FIG. 7 shows an enlarged perspective view of an adjustable stopper assembly, generally indicated by reference character 28. The adjustable stopper assembly is used to set a maximum pivot angle which the elongated receptacle can swing open from a retracted position. As can be seen in FIG. 7, the adjustable stopper assembly 28 comprises a stopper mounting member 29 which is fixedly secured to the hinge arm 22 adjacent the hinge joint 21, a stopper plug member 30 having a threaded shank 31, a stopper nut 32 threadedly mounted on the threaded shank 31 of the stopper plug member 30, and a stopper plate member 33 which is fixedly secured to the hinge base 20. The stopper mounting member 29 has a threaded hole with a central axis normal to the hinge joint 21. And the threaded shank 31 of the stopper plug extends through the threaded hole of the stopper mounting member 29 from the surface facing the stopper plate member 33.

Adjusting the adjustable stopper assembly 28 to set the maximum pivot angle of the elongated receptacle 14 is a simple procedure. First, the elongated receptacle 14 is swung open to a desired maximum angle. The stopper plug member 30 is then threadedly extended from the stopper mounting member 29 until the stopper plug member 30 abuts against the stopper plate member 33. The length of the stopper plug member 30 which extends towards the stopper plate member 33 beyond the stopper mounting member 29 determines the maximum pivot angle that the elongated receptacle 14 is capable of swinging. The shorter the length of the stopper plug member 30 extending beyond the stopper mounting member 29, the greater the maximum pivot angle. And the longer the length of the stopper plug member 30 extending beyond the stopper mounting member 29, the smaller the maximum pivot angle. And finally, after the stopper plug member 30 is adjusted to a desired length, the stopper nut 32 is abutted against the stopper mounting member 29 and tightened. Thereafter, the swing movement of the elongated receptacle 14 will stop when the stopper plug member 30 contacts the stopper plate member 33. FIG. 8 and FIG. 9, both show the hinged carrier assembly 10 in a retracted position with the stopper plug member 30 separated from the stopper plate member 33. The stopper mounting member 29, along with the stopper plug 30 and stopper nut 32, pivots together with the hinge arm 22 as the elongated receptacle 14 pivots about the binge joint 21.

As can be seen in FIG. 2A and FIG. 2B, an elongated suspension-line member 42 supplementarily supports the elongated receptacle 14. It serves as an additional measure of supporting the cantilever-like loads and stresses created at the hinge joint. The elongated suspension-line member 42 is generally made of a suitably inelastic material capable of supporting heavy line tensions, such as stranded steel cable. The elongated suspension-line member 42 has a lower line end 44 which is secured to the swing end 16 of the elongated receptacle 14, and an upper line end 43 which is secured to an upper portion of the mounting corner 12. In particular, FIG. 2A and FIG. 2B together show the simultaneous movement of the elongated suspension-line member 42 when the elongated receptacle 14 is swung about the mounting corner 12. The elongated suspension-line member 42 is able to pivot durably and smoothly about the upper portion of the mounting corner 12 due to a swivel assembly 45.

As can be best seen in FIG. 6, the swivel assembly 45 has a swivel base member 46 fixedly secured to the upper portion of the mounting corner 12 and a swivel pin housing member 47 secured to the swivel base member 46. The swivel base member 46 is preferably secured to an upper portion of the hollow frame member 24 to provide the most durable support for the elongated suspension-line member 42. The swivel pin housing member 47 has a generally tubular shape with a cylindrical cavity. And a swivel pin member 48 having a generally cylindrical configuration is pivotally seated within the cylindrical cavity of the swivel pin housing member 47. The upper line end 43 of the elongated suspension-line member 42 secures to the swivel assembly 45 by a connector ring member 50 fixedly attached to the upper end of the swivel pin member 48. The swivel pin member 48 is restrained from falling out of the swivel pin housing member 47 by the connector ring member 50 at the upper end of the swivel pin member 48, and a swivel locking pin 49 at the lower end of the swivel pin member 48. The connector ring member's 50 larger diameter restrains the swivel pin member 48 at the upper end. It is preferable to lubricate the inner surface of the cylindrical cavity with a conventional lubricant, such as grease, to reduce friction between the swivel pin member 48 and the swivel pin housing member 47. In this manner, the swivel assembly 45 allows the upper line end 43 of the elongated suspension-line support to pivot smoothly and durably.

Additionally, FIG. 2A and FIG. 2B best show a vertically adjustable support stand 34 which is secured to the swing end 16 of the elongated receptacle 14. The vertically adjustable support stand 34 comprises a stand base member 35, an elongated column member 36 having a top end 37 and a bottom end 38, a stand mounting member 40 having a hollow cavity, and a means for releasably locking the elongated column member 36. The elongated column member 36 is attached at the bottom end 38 to the stand mounting member 40. At the top end 37, the elongated column member 36 is slidably positioned through the hollow cavity of the stand mounting member 40. In one embodiment of the vertically adjustable support stand 34 the means for releasably locking the elongated column member 36 is a stand locking pin 41 used to detachably secure the elongated column member 36 at various heights. To accomplish this, the stand mounting member 40 has a pair of aligned holes on opposing sides of its generally tubular shape. And the elongated column member 36 also has a plurality of vertically arranged holes 39. Preferably, the holes are near the top end 37, with at least one hole near the bottom end 38. The one hole near the bottom end 38 is primarily used to completely retract the vertically adjustable support stand 34 when not in use.

Adjusting the vertically adjustable support stand 34 is a simple procedure. Initially, the stand locking pin 41 is removed from the stand mounting member 40. Next, the holes in the stand mounting member 40 are aligned with a hole selected from the plurality of vertically arranged holes 39 in the elongated column member 36 at the desired height. And finally, the stand locking pin 41 is inserted into the aligned combination of holes. FIG. 2A shows the vertically adjustable support stand 34 completed retracted and not in use. And FIG. 2B shows the vertically adjustable support stand 34 fully extended and adjusted to support the elongated receptacle 14. As can be seen by both FIG. 2A and FIG. 2B, the vertically adjustable support stand 34 is generally retracted when the elongated receptacle 14 is retracted, and is generally fully extended when the elongated receptacle 14 is also fully open and extended. However, it is important to note that even when the vertically adjustable support stand 34 is not used when the elongated receptacle 14 is swung open, the elongated suspension-line member 42 provides the additional support generally required to handle the greater loads associated with equipment typically used with sport equipment trailers 11.

Additionally, the elongated receptacle 14 can also be supported at the swing end 16 while in the retracted and closed position. As can be best seen in FIG. 5, an upper support member 51 is secured to the swing end 16 of the elongated receptacle 14. A lower support member 52 is secured to the rear end of the sport equipment trailer 11. In the retracted position the upper support member 51 rests on top of the lower support member 52. Additionally, the upper support member 51 and the lower support member 52 are detachably secured by a connector member 53.

By the term "sport equipment trailer" it is intended to mean a trailer which has a hinged door/ramp positioned on the back of the trailer used for loading and unloading.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A hinged carrier assembly for attachment to the rear end of a sport equipment trailer, said hinged carrier assembly comprising:

an elongated receptacle having a pivot end, a swing end, a platform base, and a length extending across the rear end of the sport equipment trailer;

a hinge for pivotally connecting said elongated receptacle to the rear end of the sport equipment trailer, said hinge having a hinge base adapted to be fixedly secured to a corner edge of the rear end of the sport equipment trailer, said hinge base having a hinge joint with a vertical pivot axis, and a hinge arm fixedly secured to the pivot end of said elongated receptacle and pivotally mounted to the hinge base at the hinge joint, whereby said elongated receptacle swings about the corner edge of the rear end of the sport equipment trailer on a horizontal plane from a retracted position to a fully extended position; and means for suspension supporting said elongated receptacle for reducing stress on said hinge and providing additional support and stability to said elongated receptacle, said means for suspension supporting said elongated receptacle comprising an elongated suspension-line member having an upper line end and a lower line end, a means for securing the upper line end to an upper portion of the corner edge above said hinge at the rear end of the sport equipment trailer, and a means for securing the lower line end near the swing end of said elongated receptacle, whereby said means for suspension supporting said elongated receptacle swings about the corner edge of the rear end of the sport equipment trailer together with said elongated receptacle.

2. A hinged carrier assembly as in claim 1, wherein the upper line end and the lower line end each have a generally closed-loop configuration.

3. A hinged carrier assembly as in claim 2, wherein the means for securing the upper line end to the upper portion of the corner edge above said hinge is a swivel assembly, said swivel assembly comprising a swivel base member adapted to be fixedly secured to the upper portion of the corner edge above said hinge, a swivel pin housing having a generally tubular shape with a cylindrical cavity, said swivel pin housing being fixedly secured to the swivel base member in a vertical orientation, a swivel pin member having a generally cylindrical configuration with a top end, a bottom end, and a length greater than the swivel pin housing member, said swivel pin member being pivotally seated within the cylindrical cavity of the swivel pin housing member, a means for connecting the upper line end to the swivel pin member, and a means for limiting vertical movement of the swivel pin member.

4. A hinged carrier assembly as in claim 3, wherein the means for connecting the upper line end to the swivel pin member is a connector ring member having a generally closed-loop configuration, the upper line end connecting therethrough, and said connector ring member being fixedly secured to the top end of the swivel pin member.

5. A hinged carrier assembly as in claim 4, wherein the means for limiting vertical movement of the swivel pin member comprises a bottom restraint and a top restraint, the bottom restraint comprising an orifice extending through the bottom end of the swivel pin member and normal to a longitudinal axis of the swivel pin member, and a swivel locking pin having a length greater than a diameter of the swivel pin member, said swivel locking pin extending through the orifice and detachably securing to the swivel pin member, and the top restraint being the connector ring member, the connector ring member having a diameter greater than an average diameter of the cylindrical cavity of the swivel pin housing, whereby the swivel pin member is restrained from vertically sliding beyond the swivel pin housing.

6. A hinged carrier assembly as in claim 1, further comprising a vertically adjustable support stand for reducing stress on said hinge and providing additional support and stability to said elongated receptacle, the support stand comprising a stand base member, an elongated column member having a top end and a bottom end, the bottom end being secured to the stand base member, a stand mounting member having a generally tubular shape with a hollow cavity, the top end of the elongated column member extending therethrough, and the stand mounting member being fixedly secured to said elongated receptacle near the swing end, and a means for releasably locking the elongated column member after slidably positioning the elongated column member of the support stand through the stand mounting member at a desired height.

7. A hinged carrier assembly as in claim 6, wherein the elongated column member of the support stand has a plurality of holes in a vertical arrangement, and wherein the mounting member has two holes on opposing sides of the generally tubular shape, and wherein the means for releasably locking the support stand comprises a support stand locking piece extending through a combination of aligned holes comprising the two holes on opposing sides of the generally cylindrical shape of the mounting member and one hole slidably selected from the plurality of holes of the elongated column member, whereby the support stand may be detachably secured at various heights.

8. A hinged carrier assembly as in claim 1, further comprising an adjustable stopper assembly for adjustably setting the fully extended position of the elongated receptacle, the adjustable stopper assembly comprising a stopper mounting member fixedly secured to the hinge arm and having a threaded hole with a central axis normal to the hinge joint, a stopper plug member having a generally cylindrical shape with a threaded shank portion, said threaded shank portion extending threadedly through the threaded hole of the stopper mounting member, a stopper nut threadedly mounted on the threaded shank portion of the stopper plug member, and a stopper plate member having at least one surface normal to the stopper plug member, said stopper plate member being fixedly secured to the hinge base, whereby the stopper plug member is adjusted to allow a desired length to extend from the threaded hole of the stopper mounting member, the stopper plug member is threadedly secured to the stopper mounting member with the stopper nut, and the stopper plug member abuts against the stopper plate when said elongated receptacle is swung about the corner edge of the rear end of the sport equipment trailer to the fully extended position.

9. A hinged carrier assembly as in claim 1, wherein said elongated receptacle has a handle means, said handle means being fixedly secured to said elongated receptacle near the swing end for manually swinging said elongated receptacle to the fully extended position.

10. A hinged carrier assembly for use with a sport equipment trailer having a hollow vertical frame member at a corner edge of the rear end of the sport equipment trailer, the rear end having a width transverse to the longitudinal axis of the trailer, said hinged carrier assembly comprising:

an elongated receptacle having a pivot end, a swing end, a platform base, and a length extending across a substantial portion of said length at the rear end of the sport equipment trailer; and means for hingedly affixing said elongated receptacle directly to the hollow vertical frame member at the corner edge of the rear end of the sport equipment trailer, the hollow vertical frame member having an inner cavity, said means for hingedly affixing comprising:

a hinge comprising a hinge base having a plurality of holes and having a hinge joint with a vertical pivot axis, said hinge base adapted to be fixedly secured directly to the hollow vertical frame member at the corner edge of the rear end of the sport equipment trailer through pre-drilled holes in the hollow vertical frame member, said pre-drilled holes of the hollow vertical frame member being respectively aligned with the holes of the hinge base, and a hinge arm fixedly secured to the pivot end of said elongated receptacle and pivotally mounted to the hinge base at the hinge joint, whereby said elongated receptacle swings about the corner edge of the rear end of the sport equipment trailer on a horizontal plane from a retracted position to a fully extended position;

a backing plate for providing structural support to said hinging means, said backing plate positioned inside the inner cavity of the hollow vertical frame member and having a plurality of threaded holes which are aligned with the pre-drilled holes of the hollow vertical frame member; and means for securing the hinge base to the hollow vertical frame member, said means for securing the hinge base to the hollow vertical frame member having an elongated threaded shank portion and an enlarged head portion, whereby said means for securing the hinge base to the hollow vertical frame member extends through the holes on the hinge base, extends through the pre-drilled holes in the hollow vertical frame member and threadedly extends through and secures to the threaded holes of the backing plate until the enlarged head portion abuts against the hinge base.

11. A hinged carrier assembly as in claim 10, further comprising a means for suspension supporting said elongated receptacle for reducing stress on said hinge and providing additional support and stability to said elongated receptacle, said means for suspension supporting said elongated receptacle comprising an elongated suspension-line member having an upper line end and a lower line end, a means for securing the upper line end to an upper portion of the corner edge above said hinge at the rear end of the sport equipment trailer, and a means for securing the lower line end near the swing end of said elongated receptacle, whereby said means for suspension supporting said elongated receptacle swings about the corner edge of the rear end of the sport equipment trailer together with said elongated receptacle.

12. A hinged carrier assembly as in claim 11, wherein the upper line end and the lower line end each have a generally closed-loop configuration.

13. A hinged carrier assembly as in claim 12, wherein the means for securing the upper line end to the upper portion of the corner edge above said hinge is a swivel assembly, said swivel assembly comprising a swivel base member adapted to be fixedly secured to the upper portion of the corner edge above said hinge, a swivel pin housing having a generally tubular shape with a cylindrical cavity, said swivel pin housing being fixedly secured to the swivel base member in a vertical orientation, a swivel pin member having a generally cylindrical configuration with a top end, a bottom end, and a length greater than the swivel pin housing, said swivel pin member being pivotally seated within the cylindrical cavity of the swivel pin housing, a means for connecting the upper line end to the swivel pin member, and a means for limiting vertical movement of the swivel pin member.

14. A hinged carrier assembly as in claim 13, wherein the means for connecting the upper line end to the swivel pin member is a connector ring member having a generally closed-loop configuration, the upper line end connecting therethrough, and said connector ring member being fixedly secured to the top end of the swivel pin member.

15. A hinged carrier assembly as in claim 14, wherein the means for limiting vertical movement of the swivel pin member comprises a bottom restraint and a top restraint, the bottom restraint comprising an orifice extending through the bottom end of the swivel pin member and normal to a longitudinal axis of the swivel pin member, and a swivel locking pin having a length greater than a diameter of the swivel pin member, said swivel locking pin extending through the orifice and detachably securing to the swivel pin member, and the top restraint being the connector ring member, the connector ring member having a diameter greater than an average diameter of the cylindrical cavity of the swivel pin housing, whereby the swivel pin member is restrained from vertically sliding beyond the swivel pin housing.

16. A hinged carrier assembly as in claim 10, further comprising a vertically adjustable support stand for reducing stress on said hinge and providing additional support and stability to said elongated receptacle, said support stand comprising a stand base member, an elongated column member having a top end and a bottom end, the bottom end being secured to the stand base member, a stand mounting member having a generally tubular shape with a hollow cavity, the top end of the elongated column member extending therethrough, and the stand mounting member being fixedly secured to said elongated receptacle near the swing end, and a means for releasably locking the elongated column member after slidably positioning the elongated column member of the support stand through the stand mounting member at a desired height.

17. A hinged carrier assembly as in claim 16, wherein the elongated column member of the support stand has a plurality of holes in a vertical arrangement, and wherein the stand mounting member has two holes on opposing sides of the generally tubular shape, and wherein the means for releasably locking the support stand comprises a support stand locking piece extending through a combination of aligned holes comprising the two holes on opposing sides of the generally tubular shape of the stand mounting member and one hole selected from the plurality of holes of the elongated column member, whereby the support stand may be adjustably secured at various heights.

18. A hinged carrier assembly as in claim 10, further comprising an adjustable stopper assembly for adjustably setting the fully extended position of the elongated receptacle, the adjustable stopper assembly comprising a stopper mounting member fixedly secured to the hinge arm and having a threaded hole with a central axis normal to the hinge joint, a stopper plug member having a generally cylindrical shape with a threaded shank portion, said threaded shank portion extending threadedly through the threaded hole of the stopper mounting member, a stopper nut threadedly mounted on the threaded shank portion of the stopper plug member, and a stopper plate member having at least one surface normal to the stopper plug member, said stopper plate member being fixedly secured to the hinge base, whereby the stopper plug member is adjusted to allow a desired length to extend from the threaded hole of the stopper mounting member, the stopper plug member is threadedly secured to the stopper mounting member with the stopper nut, and the stopper plug member abuts against the stopper plate when said elongated receptacle is swung about the corner edge of the rear end of the sport equipment trailer to the fully extended position.

19. A hinged carrier assembly as in claim 10, wherein said elongated receptacle has a handle means, said handle means being fixedly secured to said elongated receptacle near the swing end for manually swinging said elongated receptacle to the fully extended position.

* * * * *